(12) United States Patent
Ishida

(10) Patent No.: US 11,876,937 B2
(45) Date of Patent: Jan. 16, 2024

(54) IMAGE FORMING APPARATUS AND IMAGE READING DEVICE WITH AT LEAST ONE OF A FEEDER AND TRAY INCLUDING WOOD

(71) Applicant: Ricoh Company, Ltd., Tokyo (JP)

(72) Inventor: Masahiro Ishida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 254 days.

(21) Appl. No.: 17/348,063

(22) Filed: Jun. 15, 2021

(65) Prior Publication Data

US 2021/0400154 A1 Dec. 23, 2021

(30) Foreign Application Priority Data

Jun. 22, 2020 (JP) ................................ 2020-107303

(51) Int. Cl.
*H04N 1/00* (2006.01)

(52) U.S. Cl.
CPC ..... *H04N 1/00588* (2013.01); *H04N 1/00631* (2013.01)

(58) Field of Classification Search
CPC ........................ H04N 1/00588; H04N 1/00631
USPC ........................ 358/498, 474, 496
See application file for complete search history.

(56) References Cited

U.S. PATENT DOCUMENTS

| 2017/0057767 A1 | 3/2017 | Ishida et al. |
| 2018/0099828 A1 | 4/2018 | Ishida et al. |
| 2019/0361387 A1 | 11/2019 | Ishida |
| 2020/0073320 A1 | 3/2020 | Ishida |

FOREIGN PATENT DOCUMENTS

| CN | 214995902 U | * 12/2021 |
| JP | 3-008637 | 1/1991 |
| JP | 2001-130098 | 5/2001 |
| JP | 2001-130101 | 5/2001 |
| JP | 2006-042072 | 2/2006 |
| JP | 2006-130786 | 5/2006 |

* cited by examiner

*Primary Examiner* — Gabriel I Garcia
(74) *Attorney, Agent, or Firm* — XSENSUS LLP

(57) ABSTRACT

An image forming apparatus and an image reading device. The image forming apparatus includes a feeder to feed a recording material, an image forming device to form an image on the recording material fed from the feeder, and an ejection unit to which the recording material on which an image is formed by the image forming device is ejected. In the image forming apparatus, the feeder and the ejection unit are made of a plurality of components, and at least one of the plurality of components of the feeder and the ejection unit disposed near the recording material is made of wood. The image reading device includes a to-be-scanned material feeder to feed a to-be-scanned material, and a reader to read an image on the to-be-scanned material fed from the to-be-scanned material feeder. In the image reading device, the to-be-scanned material feeder comprises a plurality of components.

10 Claims, 5 Drawing Sheets

IMAGE FORMING APPARATUS AND IMAGE READING DEVICE WITH AT LEAST ONE OF A FEEDER AND TRAY INCLUDING WOOD

CROSS-REFERENCE TO RELATED APPLICATION

This patent application is based on and claims priority pursuant to 35 U.S.C. § 119(a) to Japanese Patent Application No. 2020-107303, filed on Jun. 22, 2020, in the Japan Patent Office, the entire disclosure of which is hereby incorporated by reference herein.

BACKGROUND

Technical Field

Embodiments of the present disclosure relate to an image forming apparatus and an image reading device.

Background Art

Conventionally, image forming apparatuses are known in the art each of which includes a feeder configured to feed a recording material, an image forming device configured to form an image on the recording material fed from the feeder, and an ejection unit to which the recording material on which an image is formed by the image forming device is ejected.

For example, printers or image forming apparatuses whose box-shaped component that makes up the main frame and the housing is made of wood are known in the art. Such printers or image forming apparatuses are placed in normal life space, and make up the interior design. In other words, such printers or image forming apparatuses achieve furniture-like appearance. In particular, if porous wood is used for the above box-shaped component, the use environment of ink-jet printers can easily be maintained in a desired state due to the hygroscopic properties and characteristics of porous wood.

SUMMARY

Embodiments of the present disclosure described herein provide an image forming apparatus and an image reading device. The image forming apparatus includes a feeder configured to feed a recording material, an image forming device configured to form an image on the recording material fed from the feeder, and an ejection unit to which the recording material on which an image is formed by the image forming device is ejected. In the image forming apparatus, the feeder and the ejection unit are made of a plurality of components, and at least one of the plurality of components of the feeder and the ejection unit disposed near the recording material is made of wood. The image reading device includes a to-be-scanned material feeder configured to feed a to-be-scanned material, and a reader configured to read an image on the to-be-scanned material fed from the to-be-scanned material feeder. In the image reading device, the to-be-scanned material feeder comprises a plurality of components, and at least one of the plurality of components of the to-be-scanned material feeder disposed near the to-be-scanned material is made of wood.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1A:
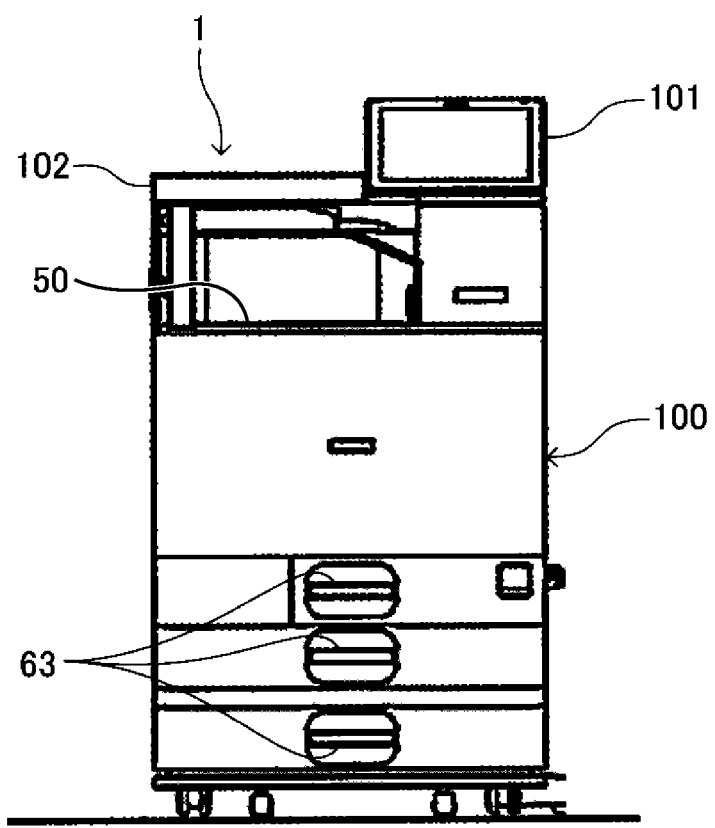
FIG. 1A is a front view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

An image forming apparatus according to an embodiment of the present disclosure is described below with reference to the drawings. The image forming apparatus according to the present embodiment is provided with an electrophotographic image forming device. However, no limitation is indicated thereby, and the image forming apparatus according to the present embodiment may be provided with image forming device that adopts different image forming methods such as an inkjet printing system. The image forming apparatus according to the present embodiment is a tandem color image forming apparatus that adopts an intermediate transfer system in which the image forming device is provided with four photoconductors. However, no limitation is indicated thereby, and the image forming apparatus according to the present embodiment may be a monochrome image forming apparatus or a color image forming apparatus a color image forming apparatus that adopts different methods or systems.

FIG. 1A is a front view of the image forming apparatus 1 according to the present embodiment.

Figure 1B:
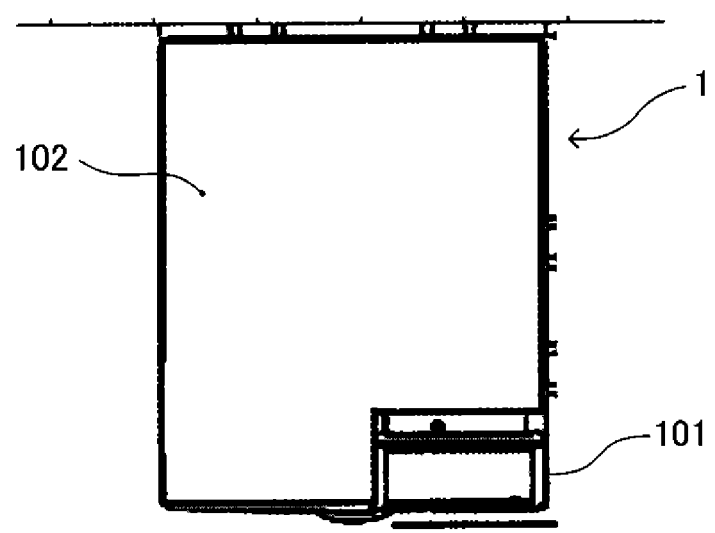
FIG. 1B is a top view of the image forming apparatus of FIG. 1A.

FIG. 1B is a top view of the image forming apparatus 1 according to the present embodiment.

Figure 2:
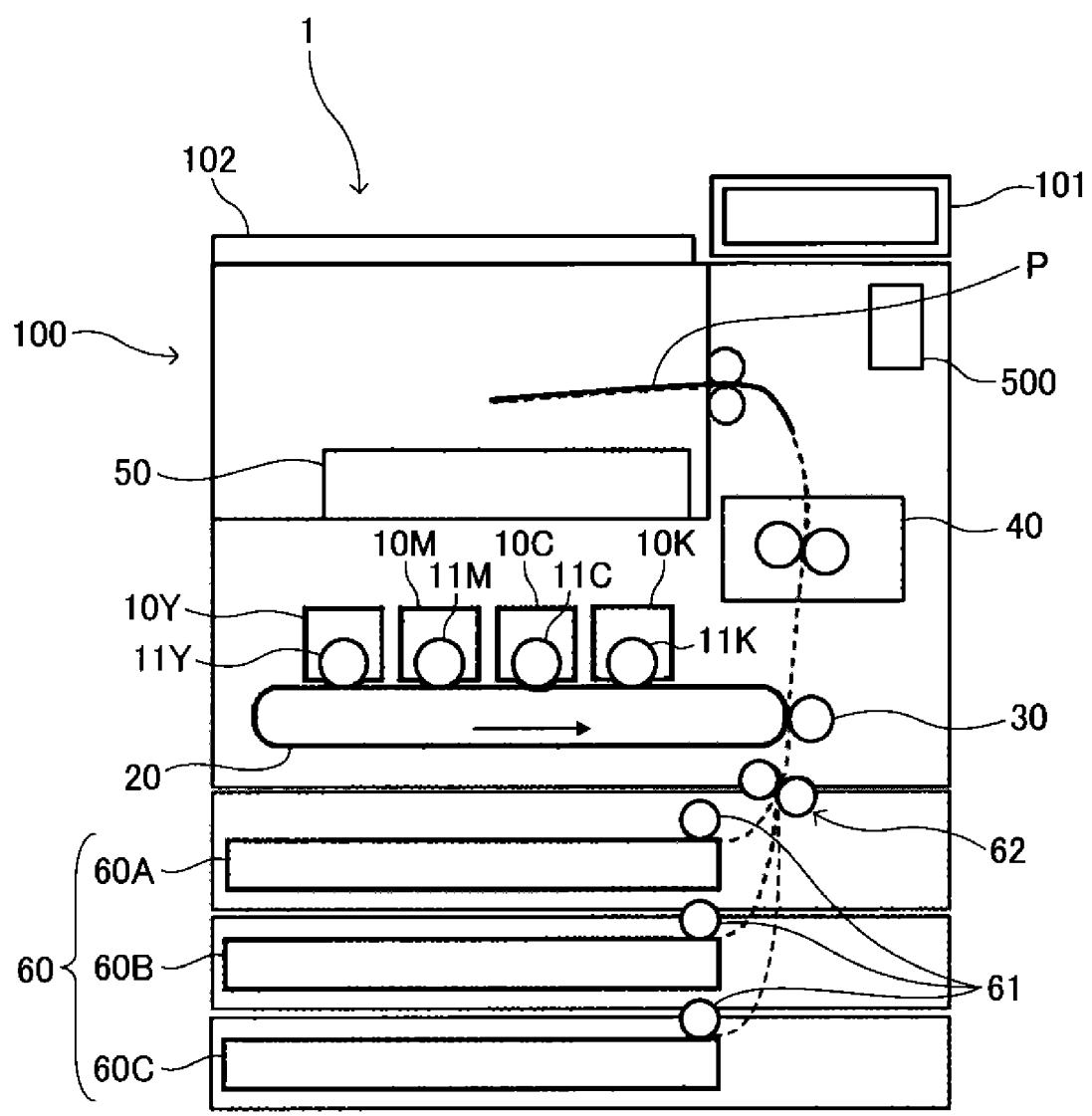
FIG. 2 is a schematic diagram illustrating a configuration of the image forming apparatus of FIG. 1A.

FIG. 2 is a schematic diagram illustrating a configuration of the image forming apparatus 1 according to the present embodiment.

The image forming apparatus 1 according to the present embodiment is provided with an image forming device 100 that forms an image on a sheet of paper P that serves as a recording material and an operation panel 101. The image forming device 100 is a tandem image forming apparatus in which a plurality of image forming units 10Y, 10M, 10C, and 10K that correspond to yellow, magenta, cyan, and black colors, respectively, are arranged along the rotation direction of an intermediate transfer belt 20 that serves as an intermediate transferor. The image forming units 10Y, 10M, 10C, and 10K are provided with a plurality of photoconductors 11Y, 11M, 11C, and 11K that serve as latent-image bearers, respectively. Each one of the multiple image forming units 10Y, 10M, 10C, and 10K is provided with a charging device, an optical writing device, a developing device, a primary transfer device, and a cleaner around the multiple photoconductors 11Y, 11M, 11C, and 11K. The charging device serves as a charger and evenly charges the surface of corresponding one of the photoconductors 11Y, 11M, 11C, and 11K at a predetermined level of electrical potential, and the optical writing device serves as an electrostatic latent image forming unit and expose the surface of corresponding one of the photoconductors 11Y, 11M, 11C, and 11K and write an electrostatic latent image on the surface of the corresponding one of the photoconductors 11Y, 11M, 11C, and 11K whose surfaces have been evenly charged by the charging devices according to the image data. The developing device forms a toner image through the developing procedure in which toner of corresponding one of the yellow, magenta, cyan, and black colors is made adhered to the electrostatic latent image formed on the corresponding one of the photoconductors, and the primary transfer device serves as a primary transfer unit and transfers the toner image formed on each one of the photoconductors onto the intermediate transfer belt 20. The cleaner removes and cleans the transfer residual toner formed on each one of the photoconductors.

The multicolor toner images that are formed on of the respective photoconductors 11Y, 11M, 11C, and 11K are primarily transferred onto the intermediate transfer belt 20 by the primary transfer device so as to be superimposed on top of one another. As a result, a color toner image is formed on the intermediate transfer belt 20. As the intermediate transfer belt 20 rotates, the color toner image that is formed on the intermediate transfer belt 20 is conveyed to the facing space where the intermediate transfer belt 20 and the secondary transfer device 30 face each other. The above facing space may be referred to as a secondary transfer area in the following description.

Moreover, in the configuration according to the present embodiment, a sheet feeder 60 that serves as a feeder and feeds the stored sheet of paper P is provided in a lower portion of the image forming device 100. The sheet feeder 60 according to the present embodiment includes three sheet feeding trays including an upper sheet feeding tray 60A, a middle sheet feeding tray 60B, and a lower sheet feeding tray 60C. The sheet feeder 60 according to the present embodiment causes a pickup roller 61 to feed the sheet of paper P on a one-by-one basis from one of the upper sheet feeding tray 60A, the middle sheet feeding tray 60B, and the lower sheet feeding tray 60C, which is selected based on the instructions sent from a controller 500 of the image forming device 100. Accordingly, the sheet of paper P is conveyed to the secondary transfer area through a conveyance roller pair 62 along the conveyance path indicated by the broken lines in FIG. 1.

The color toner image that is formed on the intermediate transfer belt 20 is transferred onto the sheet P, which is conveyed through the conveyance roller pair 62 at a prescribed timing, at the secondary transfer area by a secondary transfer device 30 in the secondary transfer process. The sheet of paper P on which a color toner image has been formed is then conveyed to a fixing device 40 that serves as a fixing unit, and heat and pressure are applied to the sheet of paper P to fix the color toner image on the sheet of paper P. The sheet of paper P on which the color toner has been fixed is conveyed along the conveyance path indicated by the broken lines in FIG. 1, and is ejected to an output tray 50 that serves as a sheet ejection unit.

In the present embodiment, the output tray 50 to which the sheet of paper P on which an image is formed by the image forming device 100 is ejected is disposed in an upper portion of the image forming device 100, and a top plate 102 is arranged is arranged above the output tray 50. As such a top plate 102 is arranged, even if the output tray 50 of the image forming apparatus 1 is disposed in an upper portion of the image forming device 100, the top face of the image forming device 100 can be used as a bench.

In the structure where the output tray 50 is arranged in an upper portion of the image forming device 100, the fixing device 40 of the image forming device 100 is also disposed in an upper portion of the image forming device 100, and is disposed near the top plate 102. For this reason, typically, the heat that is generated by the fixing device 40 tends to be conducted to the top plate 102 via, for example, a component whose thermal conductivity is high such as a metallic frame, which makes up the top face of the image forming apparatus 1. In view of such circumstances, in the structure where the output tray 50 is disposed in an upper portion of the image forming device 100, typically, wood is not used for the top plate 102 because the heat resistance of wood is low.

However, in the present embodiment, most of the top plate 102 or at least some of the top plate 102 is arranged so as to face an upper portion of the output tray 50. Due to such a configuration, the touching portion between the top plate 102 and a metallic frame or the like is small, and the heat that is generated by the fixing device 40 is not easily conducted to the top plate 102. Accordingly, in the image forming apparatus 1 according to the present embodiment, a wood whose heat resistance is low can be used for the top plate 102.

As wood is used for the top plate 102 of the image forming apparatus 1 that is frequently viewed by a user, a user can feel the warmth of wood even in, for example, an office environment where the image forming apparatus 1 is located and it is typically difficult to feel the warmth of wood, and it is expected that a user is given a calm and easeful mind. In particular, the top plate 102 according to the present embodiment is made of solid wood, and it is highly likely that a user can feel the warmness of wood.

Moreover, as the top plate 102 that is arranged so as to face an upper portion of the output tray 50 is made of wood, the moisture content of the sheet of paper P that is ejected to the output tray 50 can be adjusted due to the humidity-controlling function of wood. More specifically, the humidity of the sheet of paper P that is ejected to the output tray 50 can be reduced due to the hygroscopic function of wood. Further, the moisture that leaks from the fixing device 40 can be absorbed through a sheet ejection exit of the image forming apparatus 1. In particular, as the humidity or the moisture content can be controlled due to the humidity-controlling function of wood, the humidity can be controlled with no power consumption unlike, for example, a dehumidification heater. Such a configuration or structure provides energy savings.

As the top plate 102 that is arranged so as to face an upper portion of the output tray 50 is made of wood, the noise that escapes from the sheet ejection exit of the image forming apparatus 1 can be absorbed due to the sound-absorbing function of wood, and the noise of the image forming apparatus 1 can effectively be controlled. If wood is used for the top plate 102, which is friendly to the concept of, so-called, carbon neutrality, more environmentally-friendly production can be achieved than the cases in which products are made of metal or plastic.

In the present embodiment, a plurality of handles 63 are provided at the front of the image forming apparatus 1, and each one of such a plurality of handles serves as a touch-and-operate portion that a user directly touches and operates to pull one of the sheet feeding trays 60A, 60B, and 60C. A user grasps and pulls one of the handles 63. By so doing, one of the sheet feeding trays 60A, 60B, and 60C can be drawn out from the inside of the image forming apparatus 1, and the sheet of paper P can be set in the corresponding one of the sheet feeding trays 60A, 60B, and 60C.

In the present embodiment, the multiple handles 63 are also made of wood. As described above, if wood is used for at least one of the multiple handles 63 that a user directly touches and operates, the user can feel different textures when he or she operates such a wooden handle, compared with the cases in these elements are made of, for example, metal or plastic. In particular, the top plate 102 according to the present embodiment is made of solid wood, and it is expected that a user can appreciate good textures.

Typically, a touch-and-operate portion like the multiple handles 63 that a user directly touches and operates is made so as to be visually distinguished from a noncontact portion that is not supposed to be touched and operated by a user. As a result, the user can easily figure out a portion to be touched and operated. For this reason, in the known image forming apparatus where both the touch-and-operate portion and the noncontact portion are made of plastic, the touch-and-operate portion tends to be colored to a color different from that of a noncontact portion. By contrast, if wood is used for the touch-and-operate portion like the handles 63 according to the present embodiment, the difference in material itself can make a difference in appearance with the noncontact portion. As a result, processes such as coloring are no longer necessary in order to make a difference in appearance with the noncontact portion.

As wood is used for the handles 63, in a similar manner to the top plate 102 that is made of wood, environmentally-friendly production can be achieved than the cases in which products are made of metal or plastic.

Figure 3:
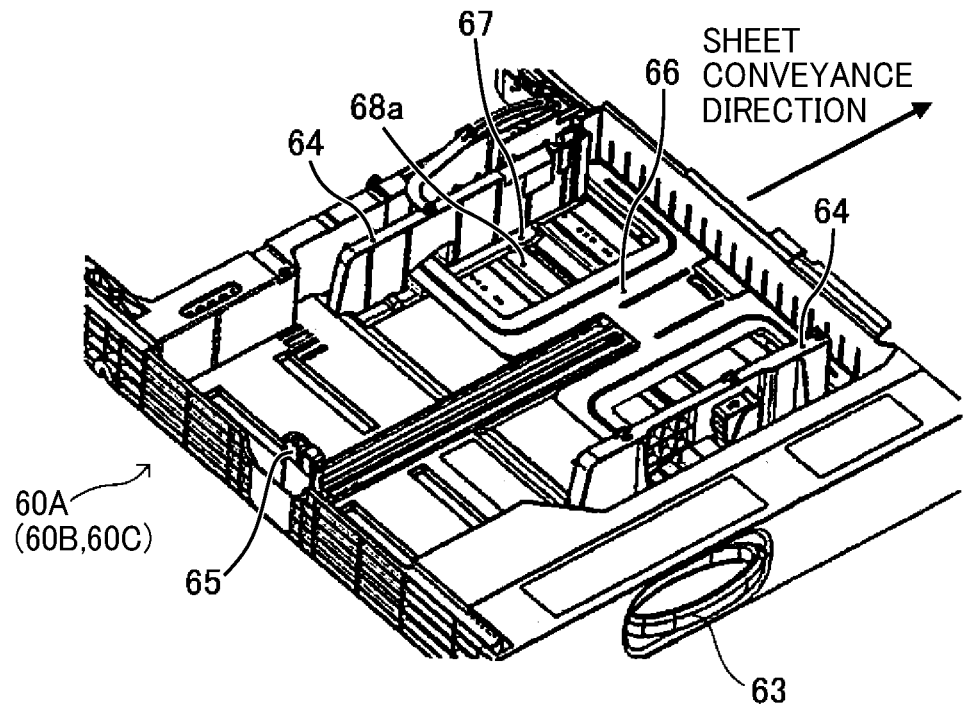
FIG. 3 is a perspective view of a sheet feeding tray of the image forming apparatus of FIG. 1A.

FIG. 3 is a perspective view of the sheet feeding tray 60A of the image forming apparatus 1 of FIG. 1A.

As illustrated in FIG. 3, in the present embodiment, a pair of side fences 64, each of which is arranged near the sheet of paper P as a component of the sheet feeding trays 60A, 60B, and 60C, are made of wood. The pair of side fences 64 according to the present embodiment are made of solid wood. As described above, since the pair of side fences 64 that are arranged near the sheet of paper P are made of wood, the moisture content of the sheet of paper P in the sheet feeding trays 60A, 60B, and 60C can be adjusted due to the humidity-controlling function of wood. More specifically, the humidity of the sheet of paper P can be reduced due to the hygroscopic function of wood. Each one of the pair of side fences 64 is a component of the sheet feeding trays 60A, 60B, and 60C, and is located inside the image forming apparatus 1. Accordingly, it is advantageous that the humidity or moisture content inside the image forming apparatus 1 can be adjusted.

Since a user directly touches and operates the pair of side fences 64, if the pair of side fences 64 are made of wood in a similar manner to the handles 63, the user can feel different textures when he or she operates such a wooden handle, compared with the cases in these elements are made of, for example, metal or plastic.

In a similar manner to the handles 63, as the pair of side fences 64 according to the present embodiment are made of wood, the difference in material itself can make a difference in appearance with the noncontact portion. As a result, processes such as coloring are no longer necessary in order to make a difference in appearance with the noncontact portion.

As the pair of side fences 64 that are located inside the image forming apparatus 1 are made of wood, the noise that is generated inside the image forming apparatus 1 can be absorbed due to the sound-absorbing function of wood, and the noise of the image forming apparatus 1 can effectively be controlled.

If wood is used for the pair of side fences 64, which is friendly to the concept of, so-called, carbon neutrality, more environmentally-friendly production can be achieved than the cases in which products are made of metal or plastic.

Such an advantageous effect of wooden member as described above may be applied not only to the pair of side fences 64 each of which serves as a restraint and restricts the position of an edge of the sheet of paper P in the direction perpendicular to the sheet conveyance direction of the sheet of paper P that is stored in the sheet feeding trays 60A, 60B, and 60C but also to an end fence 65 which serves as a restraint and restricts the position of an edge of the sheet of paper P in the sheet conveyance direction. However, in view of the fact that the pair of side fences 64 typically have a greater dimension than the end fence 65, it is more advantageous when the pair of side fences 64 are made of wood than when the end fence 65 is made of wood in regard to, in particular, the humidity-controlling function of wood, the hygroscopic function of wood, and the sound-absorbing function of wood.

Figure 4:
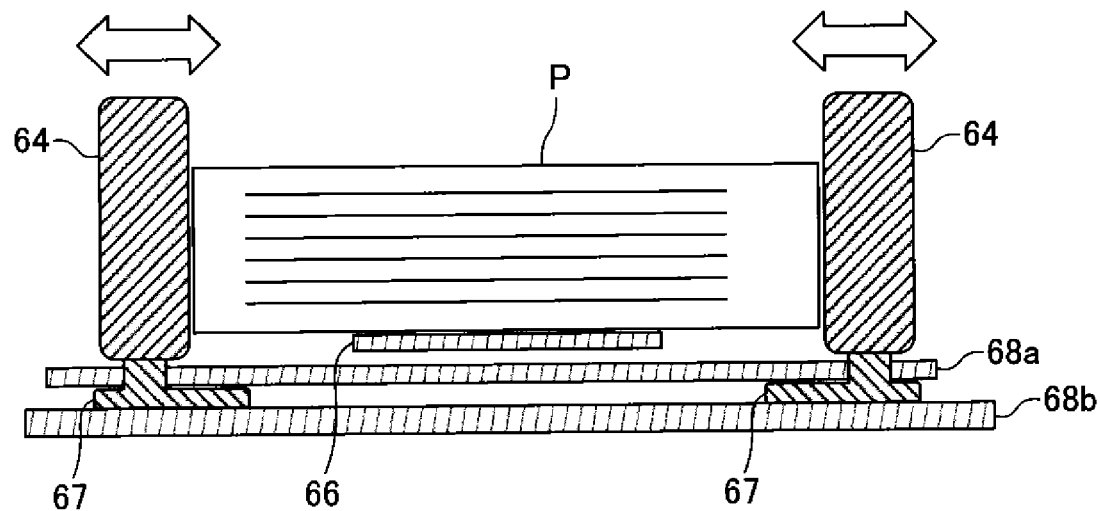
FIG. 4 is a sectional view of the sheet feeding tray of FIG. 3 in which the section is orthogonal to the sheet conveyance direction.

FIG. 4 is a sectional view of the sheet feeding tray 60A, 60B, or 60C in which the section is orthogonal to the sheet conveyance direction, according to the present embodiment.

The downside of the side fences 64 is fastened to the slider 67 that is made of resin by several elements including, for example, a screw made of metal, and side fences 64 and the slider 67 are formed as a single integrated unit. The slider 67 can slide in the direction perpendicular to the sheet conveyance direction, i.e., the direction indicated by an arrow in FIG. 4, while the movement in the sheet conveyance direction is restricted by the guide units 68a and 68b. A user grasps at least one of the pair of side fences 64, and moves the pair of side fences 64 in the direction perpendicular to the sheet conveyance direction. By so doing, the positions of the pair of side fences 64 can be determined according to the size or dimension of the sheet of paper P that is set in the sheet feeding trays 60A, 60B, and 60C.

Note also that the guide units 68a and 68b and the slider 67 can be made of wood. However, slidability and wear resistance or abrasion resistance are required for the guide units 68a and 68b and the slider 67 because such guide units and slider need to slide with each other. For the above reasons, in the present embodiment, guide units and slider that are made of resin and thus have better slidability and better wear resistance or abrasion resistance than guide units and slider that are made of wood are used. As described above, it is desired a member made of wood and a member made of non-wood material such as a member made of resin and a member made of metal be used differently as appropriate, in view of the required capability or functionality of different parts.

In each one of the sheet feeding trays 60A, 60B, and 60C according to the present embodiment, the pair of side fences 64 are made of wood and the other components are not made of wood. However, no limitation is indicated thereby, and some other components such as the base plate 66 may also be made of wood.

Figure 5:
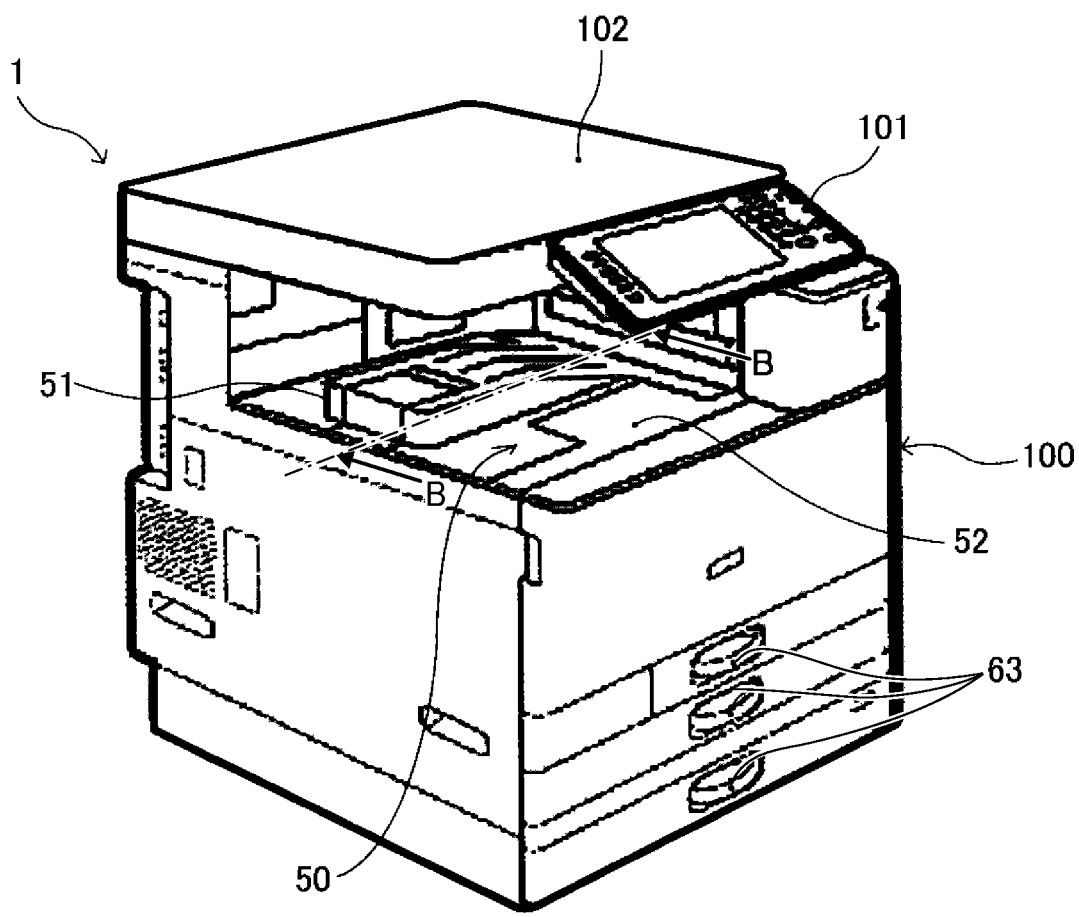
FIG. 5 is a perspective view of the image forming apparatus of FIG. 1A.

FIG. 5 is a perspective view of the image forming apparatus 1 according to the present embodiment.

Figure 6:
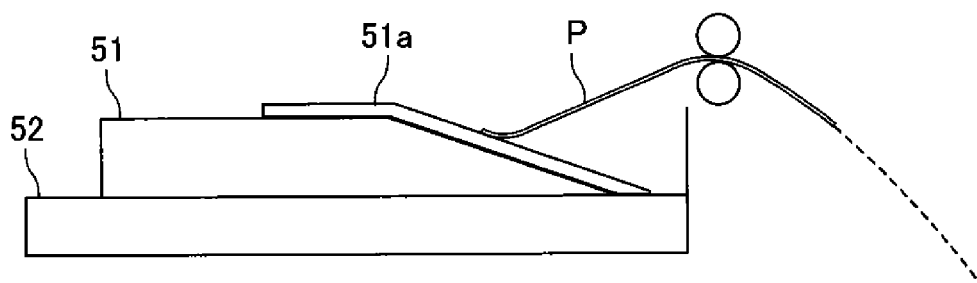
FIG. 6 is a sectional view of an output tray of the image forming apparatus of FIG. 1A in which the section is in the direction of sheet conveyance.

FIG. 6 is a sectional view of the output tray 50 in which the section is in the direction of sheet conveyance, according to the present embodiment.

In the present embodiment, among the components of the output tray 50, the tray base 51 and the base 52, each of which serve as a receptacle arranged near the sheet of paper P, are made of wood. The tray base 51 and base 52 according to the present embodiment are also made of solid wood. As described above, since the tray base 51 and the base 52 that are arranged close to the sheet of paper P are made of wood, the moisture content of the sheet of paper P that is ejected to the output tray 50 can be adjusted due to the humidity-controlling function of wood. More specifically, the moisture content of the sheet of paper P that is ejected to the output tray 50 can be reduced due to the hygroscopic function of wood. Further, the moisture that escapes from the fixing device 40 can be absorbed through a sheet ejection exit of the image forming apparatus 1.

As wood is used for the output tray 50 that is frequently viewed by a user, a user of the image forming apparatus 1 can feel the warmth of wood even in, for example, an office environment where the image forming apparatus 1 is located and it is typically difficult to feel the warmth of wood, and it is expected that a user is given a calm and easeful mind. In particular, the output tray 50 according to the present embodiment is made of solid wood, and it is highly likely that a user can feel the warmness of wood.

As the output tray 50 that is located near the sheet ejection exit from which the sound generated inside the image forming apparatus 1 leaks is made of wood, and the noise that is generated inside the image forming apparatus 1 can be absorbed due to the sound-absorbing function of wood, and the noise of the image forming apparatus 1 can effectively be controlled.

If wood is used for the output tray 50, which is friendly to the concept of, so-called, carbon neutrality, more environmentally-friendly production can be achieved than the cases in which products are made of metal or plastic.

In the present embodiment, the tray base 51 of the output tray 50 is required to have slidability such that the sheet of paper P that is ejected through the sheet ejection exit will be placed on the output tray 50 as desired. In other words, it is required that the front end of the sheet of paper P that is ejected through the sheet ejection exit or the underside of the sheet of paper P that is ejected through the sheet ejection exit can smoothly slide on the output tray 50. In order to achieve such functions, in the present embodiment, at least one rib 51a that is long in the sheet conveyance direction is arranged on the top face of the tray base 51 on which the sheet of paper P slides such that the contact area with the sheet of paper P will be reduced. Moreover, in the present embodiment, such a rib 51a is made of resin because a rib made of resin have better slidability than a rib made of wood. As described above, it is desired a member made of wood and a member made of non-wood material such as a member made of resin and a member made of metal be used differently as appropriate, in view of the required capability or functionality of different parts.

Modification

Figure 7:
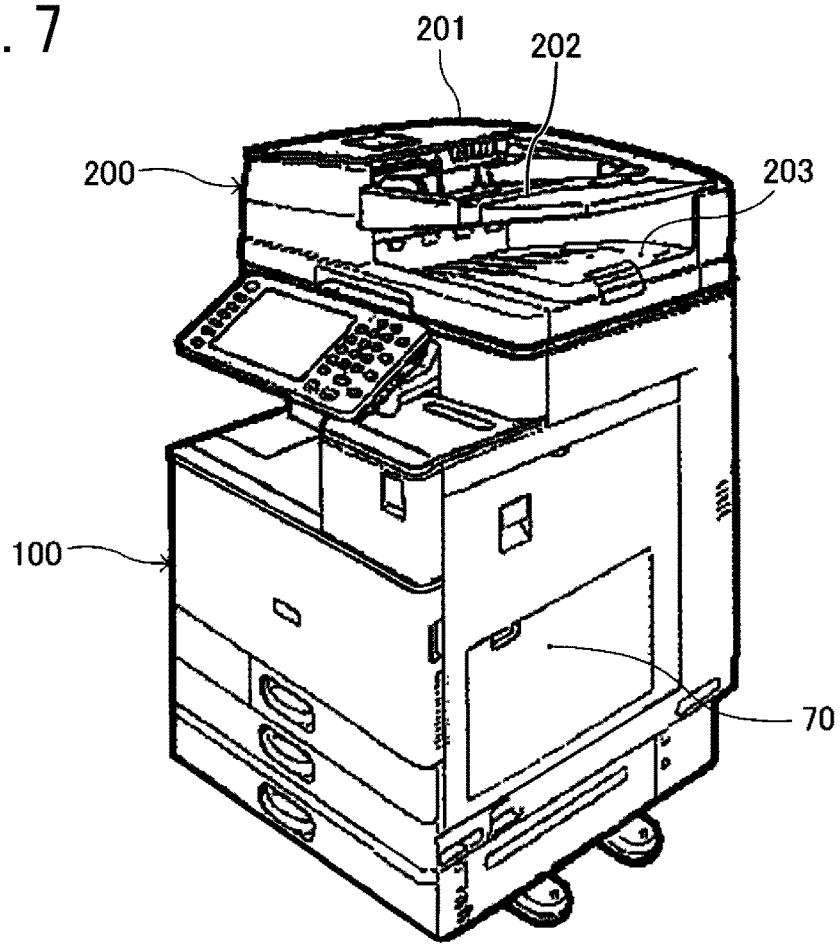
FIG. 7 is a perspective view of an image forming apparatus according to a modification of an embodiment of the present disclosure.

FIG. 7 is a perspective view of the image forming apparatus 1 according to a modification of the above embodiments of the present disclosure.

The configuration or structure of the image forming device 100 in the image forming apparatus 1 according to the present modification of the above embodiment is equivalent to the configuration or structure of the above embodiment of the present disclosure as described above. Accordingly, its description is omitted, and overlapping descriptions with the description of the above embodiment of the present disclosure as described above is omitted where appropriate.

The image forming apparatus 1 according to the present modification is provided with an image reading unit 200 that serves as an image reading device and scans an image of a document that serves as a to-be-scanned material. The image reading unit 200 according to the present modification is provided with an automatic document feeder (ADF) 201, and conveys a document, which is set on a document table 202 that serves as a to-be-scanned material feeder, on a one-piece-by-one-piece basis. The document that is sent out from the document table 202 is conveyed along a prescribed conveyance path by a plurality of conveyance roller pairs, and is ejected onto a document ejection stage 203. The image reading unit 200 according to the present modification of the above embodiments of the present disclosure adopts a sheet through method in which an image of the document that passes through an image reading position in a conveyance path is scanned and obtained by a scanner unit that serves as a reader.

As in the present modification of the above embodiments, in cases where the ADF 201 is arranged in an upper portion of the image forming apparatus 1, the ADF 201 is located at a position close to the ears of a user. For this reason, the noise that is generated while a document is being conveyed tends to become an issue. In order to handle such a situation, in the present modification of the above embodiment, some of the components of the ADF 201 is made of wood. More specifically, in the present modification of the above embodiments, some components of the image reading unit 200, for example, a restraint of the document table 202 of the ADF 201 such as the pair of side fences and a receptacle of the document table 202, and a receptacle of the document ejection stage 203, are made of wood. According to such a configuration, the noise that is generated when the document is conveyed by the ADF 201 can be absorbed due to the sound-absorbing function of wood, and the noise of the image forming apparatus 1 can effectively be controlled.

As wood is used for the ADF 201 that is arranged in an upper portion of the image forming apparatus 1 that is frequently viewed by a user, a user of the image forming apparatus 1 can feel the warmth of wood even in, for example, an office environment where the image forming apparatus 1 is located and it is typically difficult to feel the warmth of wood, and it is expected that a user is given a calm and easeful mind. In particular, the ADF 201 according to the present embodiment is made of solid wood, and it is highly likely that a user can feel the warmness of wood.

If a component of the image reading unit 200, such as a receptacle of the document ejection stage 203 and a receptacle or a restraint of the document table 202 that is arranged near the document, is made of wood, the moisture content of the sheet of paper P in the sheet feeding trays 60A, 60B, and 60C can be adjusted due to the humidity-controlling function of wood. More specifically, the humidity of the sheet of paper P can be reduced due to the hygroscopic function of wood. Moreover, an advantageous effect similar to that of the above case in which at least one of the sheet feeding trays (60A, 60B, and 60C) is made of wood can be achieved as deemed appropriate.

Figure 8:
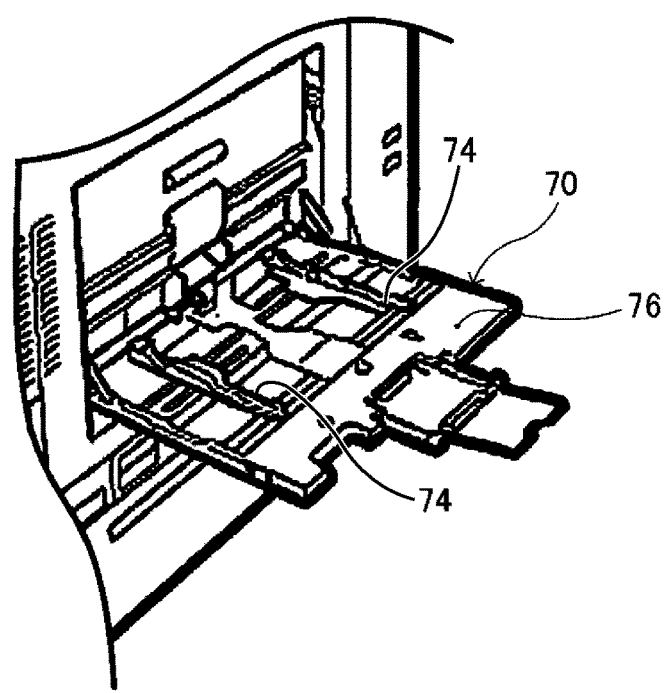
FIG. 8 is a perspective view of a manual sheet feeding tray according to an embodiment of the present disclosure.

FIG. 8 is a perspective view of the manual sheet feeding tray 70 according to the present embodiment.

As illustrated in FIG. 8, the image forming device 100 is provided with a manual sheet feeding tray 70. In a similar manner to the sheet feeding trays 60A, 60B, and 60C, for example, the pair of side fences 74 and the base plate 76, each of which is arranged near the sheet of paper P as a component of the manual sheet feeding tray 70, may be made of wood.

In the present embodiment, the terms "made of wood" and "wooden" indicate that the raw materials include wood, and indicates what is manufactured so as to achieve the required capability or functionality of wood such as humidity-controlling function of wood, sound-absorbing function of wood, warmth of wood, and good textures of wood. Note also that what is "made of wood" and what is "wooden" are not limited to what is made of wood only, and what is "made of wood" and what is "wooden" may include, for example, what is made of wood and other materials such as resin and metal as well as what is made of processed material that is derived from wood such as a medium density fiberboard, cellulose nano-fiber, and wood plastic combination.

The embodiments described above are given as an example, and unique advantageous effects are achieved for each of the following modes given below.

First Mode

According to the first mode of the present disclosure, the image forming apparatus 1 includes a feeder such as the sheet feeder 60 configured to feed a recording material such as a sheet of paper P, the image forming device 100 configured to form an image on the recording material fed from the feeder, and an ejection unit such as the output tray 50 to which the recording material on which an image is formed by the image forming device is ejected. In the image forming apparatus 1 according to the first mode of the present disclosure, one of a plurality of components of at least one of the feeder and the ejection unit disposed near the recording material such as the side fences 64, the tray base 51, and the base 52 is made of wood.

In the present mode, a wooden component that makes up at least one of the feeder and the ejection unit is disposed near the recording material. Accordingly, such a wooden component can directly contact the air around the recording material stored in the feeder or the recording material ejected to the ejection unit. According to such a configuration, the humidity or moisture content of the air can be adjusted as a wooden component exerts the humidity-controlling function of wood, and the moisture content of the recording material can appropriately be adjusted. In other words, the environments of the recording material stored in the feeder or the recording material ejected to the ejection unit can be maintained in a desired state.

Moreover, as the humidity or the moisture content can be controlled due to the humidity-controlling function of wood, the humidity can be controlled with no power consumption unlike, for example, a dehumidification heater, and such a configuration or structure provides energy savings.

Second Mode

According to the second mode of the present disclosure, in the image forming apparatus 1 according to the first mode of the present disclosure, at least one of the components made of wood includes a component such as the side fences 64 of the feeder disposed inside the image forming apparatus. According to the present mode, a wooden component exerts the humidity-controlling function of wood, and the humidity or moisture content inside the image forming apparatus can be adjusted.

Third Mode

According to the third mode of the present disclosure, in the image forming apparatus 1 according to the second mode of the present disclosure, at least one of the components made of wood is a restraint such as the side fences 64 and the end fence 65 configured to restrict a position of an edge of the recording material stored in a storage of the feeder.

According to the present mode, the restraint that is disposed adjacent to or abut the recording material is made of wood, and the moisture content of the recording material can more appropriately be adjusted due to the humidity-controlling function of wood.

Fourth Mode

According to the fourth mode of the present disclosure, in the image forming apparatus 1 according to any one of the first mode to the third mode of the present disclosure, the feeder is a manual feeder such as the manual sheet feeding tray 70, and at least one of the components made of wood includes a component of the manual feeder such as the side fences 74 and the base plate 76.

According to the present mode, a wooden component exerts the humidity-controlling function of wood, and the moisture content of the recording material that is fed through the manual feeder can appropriately be adjusted.

Fifth Mode

According to the fifth mode of the present disclosure, in the image forming apparatus 1 according to any one of the first mode to the fourth mode of the present disclosure, at least one of the components made of wood includes a receptacle of the ejection unit on which the recording material is placed, such as the tray base 51 and the base 52.

According to the present mode, a wooden component exerts the humidity-controlling function of wood, and the moisture content of the recording material that is ejected to the ejection unit can appropriately be adjusted.

Sixth Mode

According to the sixth mode of the present disclosure, the image forming apparatus 1 according to any one of the first mode to the fifth mode of the present disclosure further comprises the image reading unit 200 configured to read an image formed on a to-be-scanned material such as a document fed from a to-be-scanned material feeder such as the document table 202, and a component such as the pair of side fences of the document table 202, which is arranged near the to-be-scanned material as a component of the to-be-scanned material feeder, is made of wood.

According to the present mode, a wooden component exerts the humidity-controlling function of wood, and the moisture content of the to-be-scanned material that is fed through the to-be-scanned material feeder can appropriately be adjusted.

Seventh Mode

According to the seventh mode of the present disclosure, the image forming apparatus 1 includes a touch-and-operate portion such as the handles 63 and the pair of side fences 64 that a user directly touches and operates. In the image forming apparatus according to the present modification, at least some of a plurality of components of the supporting structure of the touch-and-operate portion such as the exterior component of the sheet feeding trays 60A, 60B, and 60C, the slider 67, and the guide units 68a and 68b is made of resin or metal, and the touch-and-operate portion is made of wood.

As described above, if wood is used for the touch-and-operate portion that a user directly touches and operates, the user can feel different textures when he or she operates such a wooden handle, compared with the cases in these elements are made of, for example, metal or plastic. Moreover, if wood is used for the touch-and-operate portion, the difference in material itself can make a difference in appearance with the noncontact portion. As a result, processes such as coloring are no longer necessary in order to make a difference in appearance with the noncontact portion.

Eighth Mode

According to the eighth mode of the present disclosure, the image forming apparatus 1 includes an ejection unit such as the output tray 50 to which the recording material such as the sheet of paper P on which an image is formed by the image forming device is ejected, and the ejection unit is disposed in an upper portion of the image forming apparatus 1. Moreover, the image forming apparatus 1 according to the present mode includes the top plate 102 disposed to face an upper portion of the ejection unit, and the top plate is made of wood.

According to the present mode, at least a portion of the top plate is arranged so as to face an upper portion of the ejection unit. Due to such a configuration, the touching portion between the top plate 102 and a metallic frame or the like of the image forming device is small, and the heat that is generated at sources of heat such as the fixing device is not easily conducted to the top plate. Accordingly, a wood whose heat resistance is low can be used for the top plate.

Moreover, as wood is used for the top plate of the image forming apparatus that is frequently viewed by a user, a user can feel the warmth of wood even in, for example, an office environment where the image forming apparatus is located and it is typically difficult to feel the warmth of wood, and it is expected that a user is given a calm and easeful mind.

Moreover, as the top plate that is arranged so as to face an upper portion of the ejection unit is made of wood, the moisture content of the recording material that is ejected to the ejection unit can be adjusted due to the humidity-controlling function of wood. More specifically, the moisture content of the recording material that is ejected to the ejection unit can be reduced due to the hygroscopic function of wood. Further, the moisture that escapes from the fixing device(40) can be absorbed through a sheet ejection exit of the image forming apparatus. In particular, as the humidity or the moisture content can be controlled due to the humidity-controlling function of wood, the humidity can be controlled with no power consumption unlike, for example, a dehumidification heater, and such a configuration or structure provides energy savings.

As the top plate that is arranged so as to face an upper portion of the output tray is made of wood, the noise that escapes from the recording-material ejection exit of the image forming apparatus can be absorbed due to the sound-absorbing function of wood, and the noise of the image forming apparatus can effectively be controlled.

Ninth Mode

According to the ninth mode of the present disclosure, in the image forming apparatus 1 according to any one of the first mode to the eighth mode of the present disclosure, at least one of the components made of wood is made of a processed material derived from wood.

According to the present mode, it may be more advantageous in, for example, cost and functionality when a processed material derived from wood is used than when, for example, solid wood is used.

Tenth Mode

According to the tenth mode of the present disclosure, in the image forming apparatus 1 according to the ninth mode of the present disclosure, the processed material is a medium-density fiberboard (MDF), cellulose nano-fiber, or wood-plastic composites (WPCs).

According to the present mode, for example, if the processed material is medium-density fiberboard (MDF), it is advantageous that the processability improves. Moreover, for example, if the processed material is medium-density fiberboard (MDF), a weight reduction can be achieved due to its low concentration or density, and a highly-desirable sound-absorbing effect can be achieved. Further, for example, if the processed material consists of wood-plastic composites (WPCs), a component can be achieved that has both the capability of wood and the capability of resin. As described above, capabilities of various kinds of processed material can be achieved.

Eleventh Mode

According to the eleventh mode of the present disclosure, in the image forming apparatus 1 according to any one of the first mode to the tenth mode of the present disclosure, at least one of the components made of wood is a combination of a wooden portion such as the pair of side fences 64 and a portion that is made of resin or a portion that is made of metal such as the guide units 68a and 68b and the slider 67.

According to the present mode, a member made of wood and a member made of non-wood material such as a member made of resin and a member made of metal can be used differently as appropriate, in view of the required capability or functionality of different parts.

Twelfth Mode

According to the twelfth mode of the present disclosure, an image reading device such as the image reading unit 200 includes a to-be-scanned material feeder such as the document table 202 configured to feed a to-be-scanned material such as a document, and a reader configured to read an image on the to-be-scanned material fed from the to-be-scanned material feeder. In the image reading device according to the present mode, a component such as the pair of side fences of the document table 202, which is arranged near the to-be-scanned material as a component of the to-be-scanned material feeder, is made of wood.

According to the present mode, a wooden component exerts the humidity-controlling function of wood, and the moisture content of the to-be-scanned material that is fed through the to-be-scanned material feeder can appropriately be adjusted.

Note that numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

What is claimed is:

1. An image forming apparatus comprising:
a feeder to feed a recording material;
an image former to form an image on the recording material fed from the feeder;
a fixer to fix the image on the recording material, the fixer disposed in an upper portion of the image former; and
a tray to which the recording material on which an imaue is formed by the image former is ejected, the tray disposed in the upper portion of the image former,
wherein the fixer and the tray are side-by-side in a horizontal direction,
wherein the feeder and the tray include a plurality of components, and
wherein at least one of the plurality of components of the feeder and the tray includes wood.

2. The image forming apparatus according to claim 1, wherein the at least one of the plurality of components including wood includes a component of the feeder disposed inside the image forming apparatus.

3. The image forming apparatus according to claim 2, wherein the at least one of the plurality of components including wood is a restraint to restrict a position of an edge of the recording material stored in a storage of the feeder.

4. The image forming apparatus according to claim 1, wherein the feeder is a manual feeder,
wherein the manual feeder comprises a plurality of components, and
wherein at least one of the components of the manual feeder includes wood.

5. The image forming apparatus according to claim 1, wherein at least one of the components including wood includes a receptacle of the tray on which the recording material is placed.

6. The image forming apparatus according to claim 1, further comprising:
an image reader to read an image on a to-be-scanned material fed from a to-be-scanned material feeder,
wherein the to-be-scanned material feeder comprises a plurality of components, and
wherein at least one of the plurality of components of the to-be-scanned material feeder includes wood.

7. The image forming apparatus according to claim 1, wherein the at least one of the components including wood includes a processed material derived from wood.

8. The image forming apparatus according to claim 7, wherein the processed material is a medium-density fiberboard, cellulose nano-fiber, or a wood-plastic composite.

9. The image forming apparatus according to claim 1, wherein the at least one of the components including wood is a combination of a wooden portion and a portion including resin or a portion including metal.

10. An image forming apparatus comprising:
a feeder to feed a recording material;
an image former to form an image on the recording material fed from the feeder; and
a tray to which the recording material on which an image is formed by the image former is ejected,
wherein the feeder and the tray include a plurality of components,
wherein at least one of the plurality of components of the feeder includes wood, and
wherein the at least one of the plurality of components including wood includes a component of the feeder disposed inside the image forming apparatus.

* * * * *